US009644784B2

(12) United States Patent
Rudier (10) Patent No.: US 9,644,784 B2
(45) Date of Patent: May 9, 2017

(54) STABILIZED PLATFORM

(71) Applicant: THALES, Neuilly sur Seine (FR)

(72) Inventor: Raymond Rudier, Elancourt (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/316,599

(22) Filed: Jun. 26, 2014

(65) Prior Publication Data

US 2014/0367537 A1    Dec. 18, 2014

Related U.S. Application Data

(63) Continuation of application No. PCT/EP2012/077042, filed on Dec. 28, 2012.

(30) Foreign Application Priority Data

Dec. 30, 2011   (FR) ...................................... 11 04159
Feb. 23, 2012   (FR) ...................................... 12 00533

(51) Int. Cl.
*F16M 11/12*      (2006.01)
*G01C 21/18*     (2006.01)
(Continued)

(52) U.S. Cl.
CPC ......... *F16M 11/123* (2013.01); *B23Q 1/5412* (2013.01); *F16M 11/08* (2013.01);
(Continued)

(58) Field of Classification Search
CPC ...... G01C 21/18; F16M 11/123; F16M 11/12; G02B 7/1822; B23Q 1/5412
See application file for complete search history.

(56) References Cited

U.S. PATENT DOCUMENTS 2,631,455 A * 3/1953 Wing ..................... G01C 21/18
33/316
3,238,795 A * 3/1966 Lipman .................. G01C 19/04
74/5.34
(Continued)

FOREIGN PATENT DOCUMENTS

DE      102014106595 A1 * 11/2014
EP        2 175 520          4/2010
(Continued)

OTHER PUBLICATIONS

International Search Report dated Jun. 10, 2013 for International Patent Application No. PCT/EP2012/077042, filed Dec. 28, 2012.

*Primary Examiner* — Eret McNichols
(74) *Attorney, Agent, or Firm* — Knobbe, Martens, Olson & Bear, LLP (57) ABSTRACT

The disclosure relates to a stabilized platform including a support frame and a supporting structure, rotatably mounted relative to the support frame around a main rotation axis. The stabilized platform also includes a supported structure, rotatably mounted relative to the supporting structure around a secondary rotation axis substantially perpendicular to the main rotation axis. The supported structure includes at least one support intended to receive a load and the support is guided in rotation by a central bearing positioned on a single side of the support according to the secondary rotation axis.

14 Claims, 3 Drawing Sheets

(51) Int. Cl.
  *B23Q 1/54* (2006.01)
  *G02B 7/182* (2006.01)
  *F16M 11/08* (2006.01)
  *F16M 11/18* (2006.01)
  *F16M 11/20* (2006.01)
  *G01D 11/30* (2006.01)
  *G03B 15/00* (2006.01)

(52) U.S. Cl.
  CPC ............ *F16M 11/12* (2013.01); *F16M 11/18* (2013.01); *F16M 11/2021* (2013.01); *G01C 21/18* (2013.01); *G01D 11/30* (2013.01); *G02B 7/1822* (2013.01); *G03B 15/006* (2013.01)

(56) References Cited

U.S. PATENT DOCUMENTS

| | | | | |
|---|---|---|---|---|
| 3,327,539 A * | 6/1967 | Moskowitz | B64G 1/288 | 33/321 |
| 3,492,735 A * | 2/1970 | Burdick | G01C 21/18 | 33/321 |
| 3,509,765 A * | 5/1970 | Berg | G01C 19/00 | 33/318 |
| 3,517,563 A * | 6/1970 | Will, Jr. | G01C 21/18 | 74/5.34 |
| 3,548,507 A * | 12/1970 | Mueller | G01C 19/02 | 33/322 |
| 3,614,895 A * | 10/1971 | Packard et al. | | 74/5.41 |
| 3,616,699 A * | 11/1971 | Brand | G01C 19/04 | 73/504.09 |
| 3,638,502 A * | 2/1972 | Leavitt et al. | | 74/5.34 |
| 3,765,631 A * | 10/1973 | Herbst et al. | | 248/583 |
| 3,931,747 A * | 1/1976 | Erspamer | | 74/5.34 |
| 4,136,844 A * | 1/1979 | Maudal | | 244/3.2 |
| 4,951,521 A * | 8/1990 | Jacobson | | 74/490.06 |
| 5,168,634 A * | 12/1992 | Misevich | | 33/515 |
| 5,184,521 A | 2/1993 | Tyler | | |
| 5,383,645 A | 1/1995 | Pedut et al. | | |
| 5,406,858 A * | 4/1995 | Brainard | | 74/5.34 |
| 5,791,591 A * | 8/1998 | Hoban | F41G 7/2213 | 244/3.16 |
| 6,155,690 A * | 12/2000 | Miyahara et al. | | 359/872 |
| 7,264,220 B2 * | 9/2007 | Dent et al. | | 248/660 |
| 7,561,784 B2 * | 7/2009 | Wescott et al. | | 396/13 |
| 7,642,741 B2 * | 1/2010 | Sidman | F16M 11/041 | 318/638 |
| 8,139,932 B2 * | 3/2012 | Zubalsky et al. | | 396/12 |
| 8,434,950 B1 * | 5/2013 | Wawro | | 396/419 |
| 8,798,450 B2 * | 8/2014 | Aicher et al. | | 396/13 |
| 2004/0173726 A1* | 9/2004 | Mercadal et al. | | 248/660 |
| 2008/0114560 A1* | 5/2008 | Jonas | | 702/94 |
| 2010/0101341 A1 | 4/2010 | Bunch et al. | | |

FOREIGN PATENT DOCUMENTS

| | | | | |
|---|---|---|---|---|
| FR | 2 551 920 | | 3/1985 | |
| GB | 657669 A | * | 9/1951 | ............... F41G 5/16 |
| JP | 5-108159 | | 4/1993 | |
| KR | 10-2015-0091023 | * | 12/2015 | |

* cited by examiner

STABILIZED PLATFORM

PRIORITY APPLICATIONS

This application is a continuation and claims benefit under 35 U.S.C. §§120 and 365 of PCT Application No. PCT/EP2012/077042, entitled "STABILISED PLATFORM," filed Dec. 28, 2012, which is herein incorporated by reference in its entirety and which claims priority to French Application No. 11 04159, entitled "STABILISED PLATFORM," filed on Dec. 30, 2011, and French Application No. 12 00533, entitled "STABILIZED PLATFORM FOR USE IN E.G. TERRESTRIAL AIRCRAFT FOR SUPPORTING E.G. INFRA-RED CAMERA, HAS SUPPORTED STRUCTURE WHOSE SUPPORT PARTS RECEIVE LOAD AND ARE ROTATABLY GUIDED BY CENTRAL BEARING, WHERE BEARING IS ARRANGED ON SIDE OF PARTS", filed on Feb. 23, 2012, which are incorporated herein by reference in their entirety.

BACKGROUND

Field

The described technology relates to a stabilized platform comprising: a support frame; a supporting structure, rotatably mounted relative to the support frame around a main rotation axis; a supported structure, rotatably mounted relative to the supporting structure around a secondary rotation axis substantially perpendicular to the main rotation axis.

Description of the Related Technology

Such stabilized platforms are notably provided on aircraft, land vehicles or ships. They carry a payload comprising apparatuses, notably optronic equipment such as cameras.

It is possible to provide a stabilized platform, in which the supporting structure is guided in rotation by two bearings attached to the support frame spaced apart from each other along the direction of the main rotation axis, the payload being attached in a supported structure integrated to the supporting structure and arranged between two other bearings spaced apart along the direction of the secondary rotation axis. The supporting structure encompasses the supported structure.

Such a platform, however, has several drawbacks. In particular, the encompassing shape of the supporting structure is detrimental to its stiffness and complicates the setting into place of the payload in the supporting structure, as well as to the access to this payload. Further, the requirement of perfect alignment of the two guiding bearings of the supported structure and of the two bearings of the supporting structure requires accurate machining.

SUMMARY OF CERTAIN THE INVENTION

A purpose of the described technology is to propose a robust stabilized platform, with a simple structure and allowing facilitated access to the payload.

For this purpose, the object of the described technology is a stabilized platform of the aforementioned type, wherein the supporting structure comprises at least one support intended to receive a load, and the support is guided in rotation by a main bearing positioned on a single side of the support according to the secondary rotation axis.

The stabilized platform according to an embodiment may also comprise one or more of the following features, taken individually or according to any technically possible combination(s): the supported structure comprises a central trunnion rotatably mounted in the central bearing, the support being positioned at a respective end of the central trunnion according to the direction of the secondary rotation axis, the support frame comprises first and second bearings for guiding in rotation the supporting structure, the first and second bearings being mounted on the support frame via a system of suspensions, the supporting structure comprises a central ring housing the central bearing and first and second end trunnions, surrounding the central ring on either side thereof according to the direction of the main axis of rotation and the support frame comprises a first and second bearing, the first end trunnion and the second end trunnion being rotatably mounted in the first and the second bearing respectively, the stabilized platform comprises a first drive assembly, able to drive into rotation the supported structure, which first drive assembly comprises a first electric motor, the first drive assembly being housed in the central ring, the first drive assembly further comprises a first angular position sensor, the central bearing being arranged, according to the direction of the secondary rotation axis, between the first electric motor and the first angular position sensor, the support is freely accessible, the support is freely accessible from its side opposite to the supporting structure along the direction of the secondary rotation axis; at least one of the supports is accessible through an aperture provided in the support frame, the supported structure is symmetrical relative to the main rotation axis, the supported structure comprises two supports arranged out on either side of the central bearing, the support extends on either side of the supporting structure along the direction of the secondary rotation axis, the supported structure only comprises one support and the central bearing is shifted relative to the main rotation axis according to the direction of the secondary rotation axis in a direction opposite to the support, the supporting structure delimits a space for receiving the support facing the central bearing according to the direction of the secondary rotation axis and at least one portion of the support extends in this reception space; the central bearing is positioned in a plane containing the axis of rotation.

According to another aspect, the object of an embodiment is also a stabilized platform comprising: a support frame; a supporting structure, rotatably mounted relative to the support frame around a main axis of rotation; and a supported structure, rotatably mounted relative to the supporting structure around a secondary rotation axis substantially perpendicular to the main rotation axis, wherein the supporting structure comprises a central bearing, able to guide in rotation the supported structure, and the supported structure comprises two supports, laid on either side of the central bearing according to the direction of the secondary rotation axis and each intended for receiving a load.

The stabilized platform described above may also comprise one or more of the following features, taken individually or according to any technically possible combination(s): the central bearing is positioned in a plane containing the main rotation axis; the supports extend on either side of the supporting structure according to the direction of the secondary rotation axis; the supported structure comprises a central trunnion, rotatably mounted in the central bearing, each support being positioned at one end of the central trunnion according to the direction of the secondary rotation axis; the support frame comprises a first and a second bearing for guiding in rotation the supporting structure, the first and second bearings being mounted on the support frame via a system of suspensions; the supporting structure comprises a central ring housing the central bearing and first and second end trunnions extending on either side of the central ring according to the direction of the main rotation axis, and the support frame comprises a first and second bearing, the first end trunnion and the second end trunnion being rotatably mounted in the first and the second bearing respectively; the stabilized platform further comprises a first drive assembly able to drive into rotation the supported structure, which first drive assembly comprises a first electric motor, the first drive assembly being housed in the central ring; the first drive assembly further comprises a first angular position sensor, the central bearing being laid out, according to the direction of the secondary rotation axis, between the first electric motor and the first angular position sensor; and at least one of the supports is accessible through an aperture provided in the support frame.

BRIEF DESCRIPTION OF THE DRAWINGS

The embodiments will be better understood upon reading the description as follows, only given as an example and made with reference to the appended drawings, wherein.

DETAILED DESCRIPTION OF THE PREFERRED EMBODIMENT

The stabilized platform according to an embodiment is for example intended to be mounted on the chassis of a movable machine, such as an aircraft, a ship or a land vehicle.

By stabilized platform is meant a device intended to receive a payload, which is controlled so as to orient it accurately regardless of the movements and of the outer environment of the machine on which it is mounted.

Figure 1:
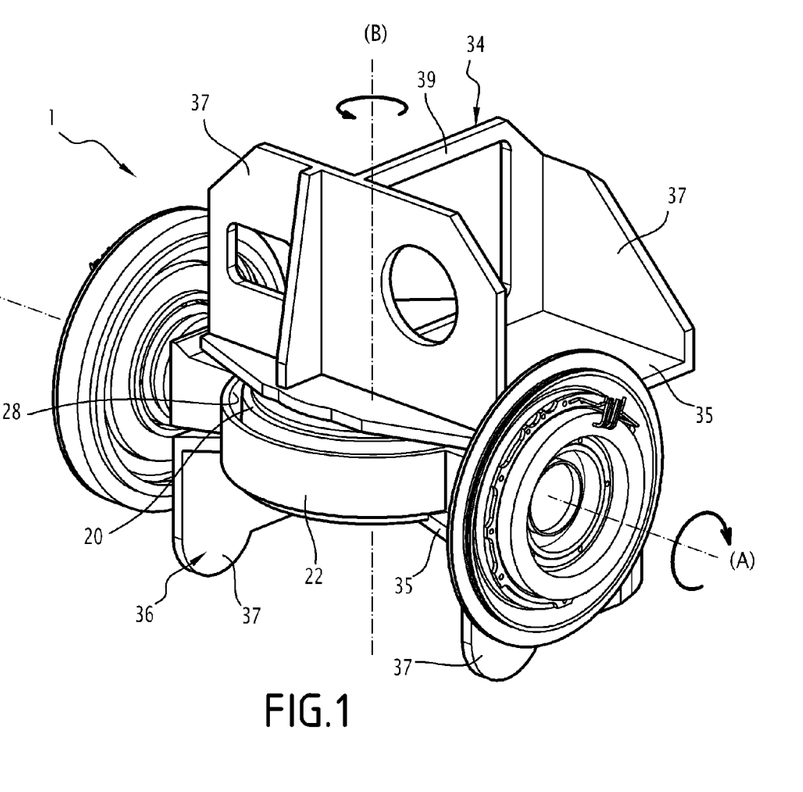
FIG. 1 is a perspective view of a portion of a stabilized platform according to a first embodiment.

FIG. 1 illustrates a stabilized platform 1 according to a first embodiment. It comprises a support frame 5, intended to be secured to the movable machine. A supporting structure 7 is mounted so as to be mobile in rotation relative to the support frame 5 around a main rotation axis A. A supported structure 10 is mounted so as to be mobile in rotation relative to the supporting structure 7 around a secondary rotation axis B. The main rotation axis A is perpendicular to the secondary rotation axis B. The supporting and supported structures 7, 10 thus form together an assembly of the two-axis universal joint type.

When the stabilized platform 1 is mounted on the movable machine with the secondary rotation axis B vertical, the rotation around the main rotation axis A corresponds to an elevational movement, while rotation around the secondary rotation axis B corresponds to a circular movement.

The support frame 5 comprises a first and a second bearing 12, 14 able to ensure guiding in rotation of the supporting structure 7 relative to the support frame 5. More specifically, the first and second bearings 12, 14 are spaced apart from each other along the direction of the main rotation axis A. In the illustrated example, the bearings 12, 14 are bearings with ball bearings. They each comprise two adjacent ball bearings.

The first and second bearings 12, 14 are mounted on the support frame 5 via a suspension system. The latter comprises a first and second suspension ring 16, 18 schematically illustrated in FIG. 2. The first and second suspension rings 16, 18 are respectively interposed between the support frame 5 and the first and second bearings 12, 14. They each have a substantially annular shape centered on the main rotation axis A. The first suspension ring 16 surrounds circumferentially the first bearing 12. The second suspension ring 18 surrounds circumferentially the second bearing 14.

The supporting structure 7 substantially extends along an extension direction coinciding with the direction of the main rotation axis A. It comprises a central bearing 20, able to guide in rotation the supported structure 10 around the secondary rotation axis B. In the first embodiment, the central bearing 20 is positioned in the plane containing the main rotation axis A. The supporting structure 7 substantially has the shape of a beam.

More specifically, the supporting structure 7 comprises a central ring 22 (FIG. 1) and first and second end trunnions 24, 26 (FIG. 2) extending on either side of the central ring 22 according to the direction of the main rotation axis A.

More particularly, the supporting structure 7 extends, according to the direction of the secondary rotation axis B, between a first plane $P_1$ and a second plane $P_2$, the planes $P_1$ and $P_2$ being normal to the secondary rotation axis B, and spaced apart along the direction of the secondary rotation axis B.

According to the direction of the secondary rotation axis B, the end trunnions 24, 26 substantially extend between the first plane $P_1$ and the second plane $P_2$. The central ring 22 also extends between the planes $P_1$ and $P_2$.

The first and second end trunnions 24, 26 are rotatably mounted in the first and second bearings 12, 14, respectively. Thus, the supporting structure 7 is guided in rotation around the main rotation axis A by the first and second bearings 12, 14 of the support frame 5.

The central ring 22 delimits a central through-orifice 28 centered on the secondary rotation axis B. In the illustrated example, the central ring 22 has a substantially annular shape centered on the secondary rotation axis B.

The central bearing 20 is housed in the central ring 22. It extends in a plane containing the main rotation axis A. In the illustrated example, the main bearing 20 is a ball bearing comprising bearing. It comprises a pair of coaxial adjoining roller bearings 30. The roller bearings 30 are in particular angular contact ball bearings. Each roller bearing 30 comprises an outer ring, secured to the supporting structure 7 and an inner ring, secured to the supported structure 10, the inner and outer rings delimiting between them a rolling path on which roll the balls of the roller bearing 30.

Figure 2:
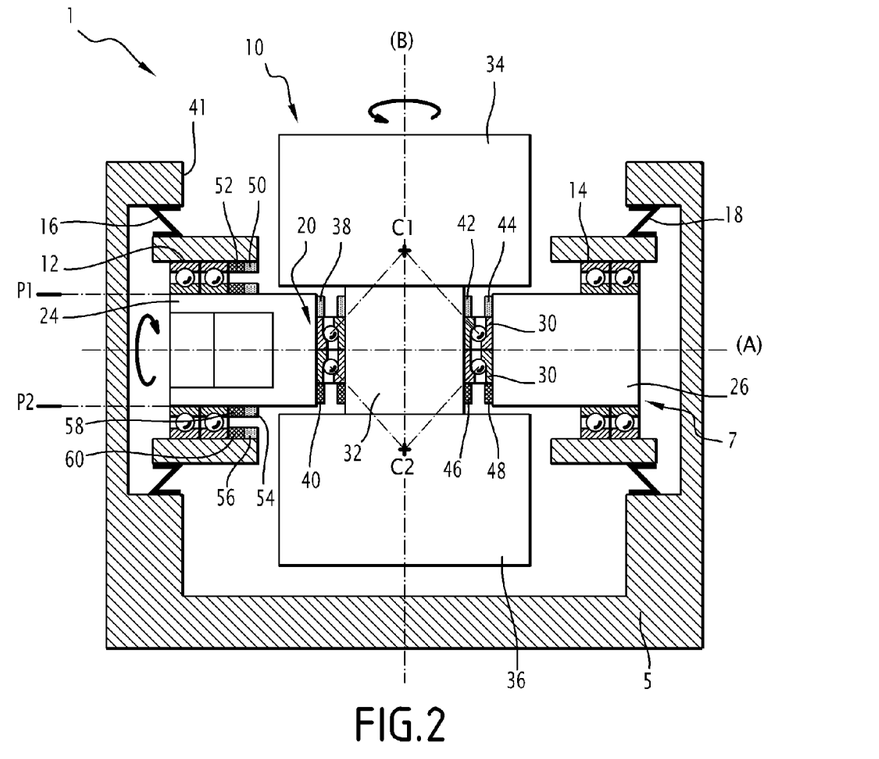
FIG. 2 is a schematic sectional view of the stabilized platform according to the first embodiment.

In the first embodiment, the two roller bearings 30 of the pair of roller bearings are arranged on either side of the main rotation axis A according to the direction of the secondary rotation axis B. They are symmetrical relative to a plane containing the main rotation axis A, in particular relative to the plane normal to the secondary rotation axis B. The intersection point C1, C2 of the load lines of the roller bearings 30 are located on the secondary rotation axis B. They are symmetrical relative to the main rotation axis A. The roller bearings 30 of the pair of roller bearings are selected so that the intersection points C1, C2 of the load lines of each roller bearing 30 are as far as possible from the main rotation axis A according to the direction of the secondary rotation axis B, on the same side of the main rotation axis A as the considered roller bearing 30. The intersection points C1 and C2 are schematically illustrated in FIG. 2.

The tilting rigidity of the central bearing 20 is adjusted to the need of rigidity of the assembly. It is all the higher the greater the distance between the intersection points C1 and C2 (FIG. 2) of the load lines of the roller bearing 30 and the greater the diameter of the central bearing 20.

The supported structure 10 substantially extends along an extension direction coinciding with the direction of the secondary rotation axis B.

Figure 3:
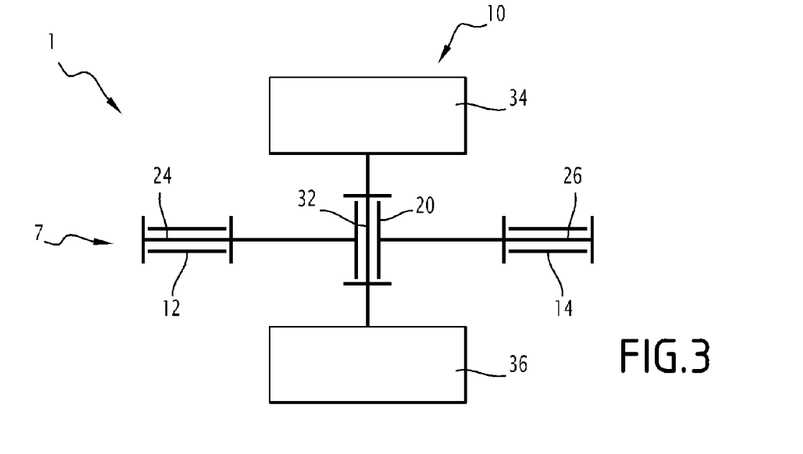
FIG. 3 is a schematic view of the layout of the bearings for guiding in rotation of the stabilized platform of FIG. 2.

In the first embodiment (FIGS. 1 to 3), the supported structure 10 comprises a central trunnion 32 and two supports 34, 36.

The central trunnion 32 substantially extends according to the direction of the secondary rotation axis B, perpendicular to the mean plane of the supporting structure 7. The supports 34, 36 are arranged on either side of the central trunnion 32 according to the direction of the secondary rotation axis B.

The supports 34, 36 arranged on either side of the central bearing 20 according to the direction of the secondary rotation axis B. They extend, for example symmetrically, on either side of the supported structure 7 according to the direction of the secondary rotation axis B. The supports 34, 36 protrude outside the supported structure 7. The supports 34, 36 each extend outside of the space delimited between the first and second planes $P_1$, $P_2$. In particular, they each extend entirely outside of the space delimited between these first and second planes $P_1$, $P_2$.

The supported structure 10 is guided in rotation around the secondary rotation axis B by the central bearing 20. The central trunnion 32 is rotatably mounted in the central bearing 20. Each support 34, 36 is guided in rotation around the secondary rotation axis B by the central bearing 20, which is positioned on a single side of the respective support 34, 36.

The supported structure 10 is thus guided in rotation by a single central bearing 20. As described earlier, this single central bearing 20 for example comprises two adjacent coaxial roller bearings 30, advantageously adjoining each other.

The mass in rotation around the secondary rotation axis B, i.e. the total mass of the supported structure 10, has its center of gravity as close as possible to the secondary rotation axis B.

The supports 34, 36 are attached to opposite ends of the central trunnion 32 according to the direction of the secondary rotation axis B. The supports 34, 36 are in particular attached to the central trunnion 32 removably, for example via a respective mounting bracket. Thus, each support 34, 36 is able to be detached from the central trunnion 32 and to be replaced with another support 34, 36 depending on the needs, and notably depending on the nature of the payload.

The supports 34, 36 are intended to receive a load, in particular a payload and/or a mass. The payload for example comprises optronic sensors such as thermal, infrared, near infrared or visible cameras, laser pointers, laser illuminators and/or laser telemeters. It further comprises a gyroscope or inertial system, able to measure the orientation of the stabilized platform 1 in an absolute reference system. According to an embodiment, each support 34, 36 bears a payload. Alternatively, only one of the supports 34, 36 bears a payload, while the other support 34, 36 receives a balancing weight.

The supports 34, 36 for example have the shape of a tray comprising housings for receiving the payload. They extend facing the supporting structure 7 on either side of the central orifice 28 of the central ring 26. The length of the supports 34, 36 taken parallel to the main rotation axis A is notably greater than the diameter of the central trunnion 32.

As an example, a support 36 is illustrated in FIG. 1, comprising a base wall 35 oriented towards the supporting structure 7 and two side walls 37 protruding away from the supporting structure 7 from the base wall 35, and notably substantially parallel with each other. The support 36 is open on two side walls, as well as on its side opposite to the supporting structure 7. The payload housed in this support 36 is thus accessible from the side of the support 36 opposite to the supporting structure 7, as well as through two lateral sides. The support 34 illustrated as an example in FIG. 1 also includes a base wall 35 and two side walls 37. The side walls 37 are connected together through a transverse stiffening wall 39 extending on at least one portion of their height taken along the direction of the secondary rotation axis B. Optionally, at least one side wall comprises one or several housings for receiving the payload, notably in the form of through-orifices adapted to the interfaces of the sensors selected for the application.

According to an embodiment, the supports 34, 36 are identical. Alternatively, they have different shapes. The shape of each support 34, 36 notably depends on the payload which it receives.

Each support 34, 36 is freely accessible through its side opposite to the supporting structure 7 according to the direction of the secondary rotation axis B. In particular, the support frame 5 comprises an aperture 41 for accessing the load housed in the supports 34, 36.

The stabilized platform 1 further comprises a first drive assembly, able to drive into rotation the supported structure 10. The first drive assembly is schematically illustrated in FIG. 2. It is housed in the central ring 22. It comprises a first electric motor 38, able to drive into rotation the supported structure 10, a first angular position sensor 40 and a first electric revolving joint (not shown), able to provide the electric power supply of the payload received in the supports 34, 36.

In the example illustrated in FIG. 2, the first electric motor 38 and the angular position sensor 40 are arranged in the central ring 22 on either side of the central bearing 20 according to the direction of the secondary rotation axis B.

The first electric motor 38 conventionally comprises a rotor 42 and a stator 44. It is a motor with an internal rotor. In particular, the first electric motor 38 is a flat motor, further called a disc motor. The rotor 42 is secured to the central trunnion 32 of the supported structure 10, which it drives into rotation. The stator 44 circumferentially surrounds the rotor 42. It is fixedly mounted relative to the supporting structure 7.

The first angular position sensor 40 is able to measure the angular position of the rotor 42 of the first electric motor 38. In the example illustrated in FIG. 2, the first angular position sensor 40 a resolver. Conventionally, the resolver comprises a rotor 46 provided with a primary coil and a stator 48 provided with two secondary coils. The rotor 46 of the resolver is secured in rotation to the shaft of the first electric motor 38. The stator 46 of the resolver is fixed relative to the supporting structure 7. The primary coil of the rotor 46 of the resolver is powered with an excitation voltage. The rotation of the rotor 46 relative to the stator 48 induces in the secondary coils of the stator 48, a voltage, the value of which depends on the angular position of the rotor 46 of the resolver and therefore of the rotor 42 of the first electric motor 38.

The stabilized platform 1 further comprises a second drive assembly, able to drive into rotation the supporting structure 7. The second drive assembly is schematically illustrated in FIG. 2. It is positioned at one of the bearings 12, 14 of the support frame 5. It has a structure similar to the one of the first drive assembly. In particular, it comprises a second electric motor 50, able to drive into rotation the supporting structure 7, a second angular position sensor 52 and a second electric revolving joint (not shown), able to provide the electric power supply of the first electric motor 38 and of the payload received in the supports 34, 36. In the example illustrated in FIG. 2, the second electric motor 50 and the second angular position sensor 52 are adjacent according to the direction of the main rotation axis A.

The second electric motor 50 comprises a rotor 54 secured to the first end trunnion 24 and a stator 56 fixedly mounted relative to the support frame 5. The second angular position sensor 52 comprises a rotor 58 and a stator 60 similar to those of the first angular position sensor 40. The rotor 58 is secured in rotation to the shaft of the second electric motor 50. The stator 60 of the resolver is fixed relative to the support frame 5.

The stabilized platform 1 according to the first embodiment has the following advantages.

The use of a single bearing 20 for guiding in rotation the supported structure 10 simplifies the design and the manufacturing of the platform 1 by avoiding having to align several bearings with each other. Further, the reduction in the number of bearings contributes to reducing the total mass of the stabilized platform 1.

The beam shape of the supporting structure 7 simplifies the manufacturing of this structure 7, as well as the mounting of the platform 1. It also improves the rigidity of the supporting structure 7 thereby reducing the risks of deformation of the platform 1. Further, it increases the space available for the payload, the latter being no longer limited by the dimensions of an encompassing supporting structure 7.

For a same transported payload, the beam shape of the supporting structure 7 generates a reduction in the total mass of the platform 1.

The layout of supports 34, 36 intended to receive the payload on either side of the supporting structure 7 facilitates access to the payload, notably during its integration into the supports 34, 36 or during maintenance operations. Further, it gives the possibility of providing interchangeable removable supports 34, 36 depending on the received payload. This particular layout of the supports 34, 36 is notably made possible by the shape of the supporting structure 7, which no longer encompasses the supported structure 10, and which therefore in particular does not encompass the supports 34, 36 for the payload.

The mounting of the first and second bearings 12, 14 on the support frame 5 via the system of suspensions is advantageous. Indeed, the system of suspensions filters the vibrations transmitted by the support frame 5. The relative flexibility of the suspension system guarantees the alignment of the bearings 12 and 14 without requiring costly manufacturing tolerances of the support frame 5.

Figure 4:
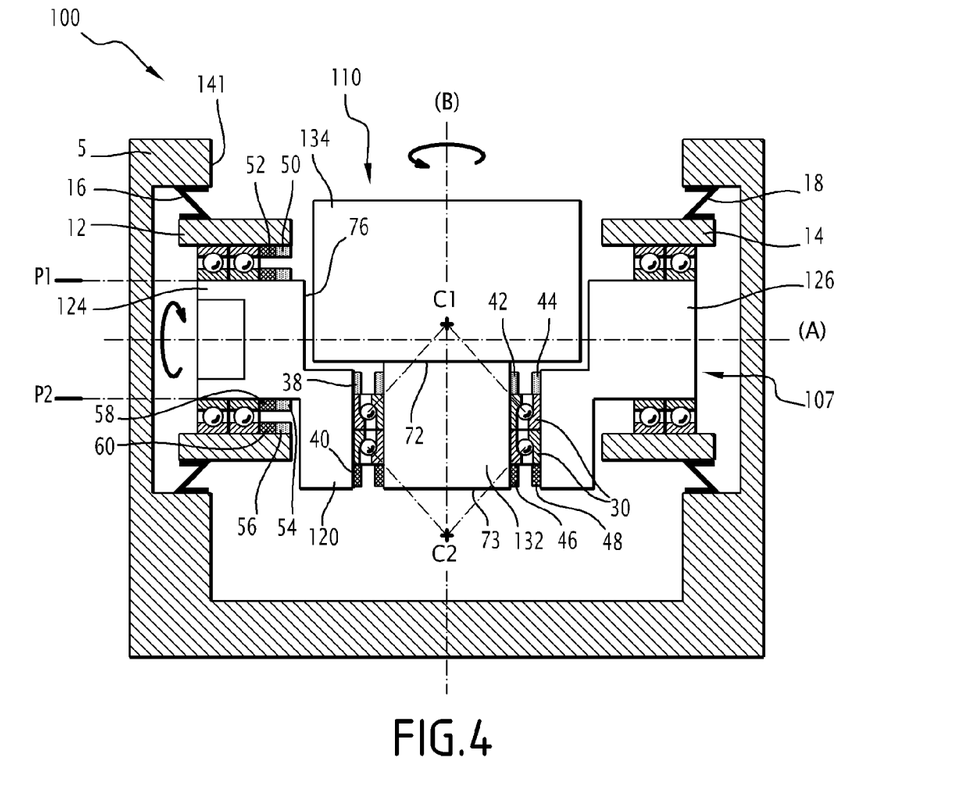
FIG. 4 is a schematic sectional view of a stabilized platform according to a second embodiment.
Figure 5:
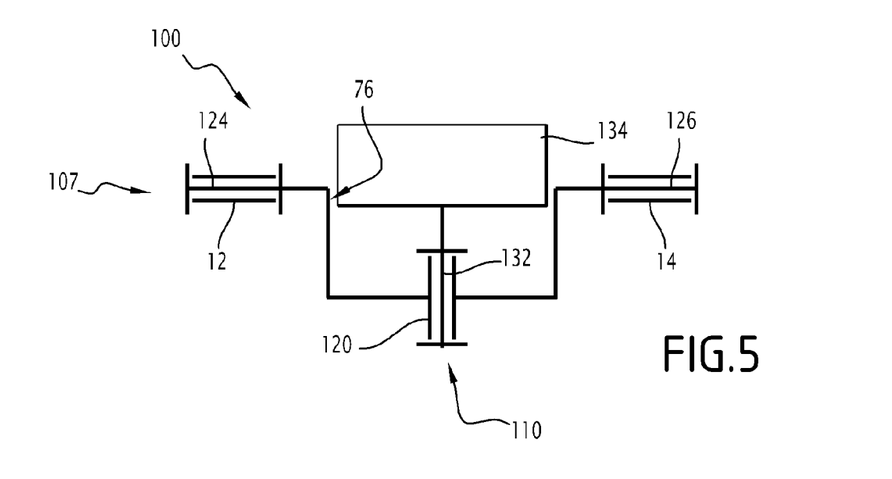
FIG. 5 is a schematic view of the layout of the bearings for guiding in rotation of the stabilized platform of FIG. 4.

A stabilized platform 100 according a second embodiment is illustrated in FIGS. 4 and 5. Only the differences relative to the stabilized platform 1 according to the first embodiment will be described hereafter.

The stabilized platform 100 according to the second embodiment differs from that according to the first embodiment in that the supporting structure only comprises one support 134 intended to receive a load. Further, the supporting structure 110 of the stabilized platform 100 has a different shape from that of the stabilized platform 1 according to the first embodiment.

As illustrated in FIGS. 4 and 5, the stabilized platform 100 comprises a supported structure 110 comprising a central trunnion 132 and a single support 134. The support 134 is attached to one end 72 of the central trunnion 132 according to the direction of the secondary rotation axis B. An end 73 of the central trunnion 132 opposite to the end 72 is free, i.e. it does not bear any support.

The supported structure 110 is guided in rotation by a central bearing 120 of a supporting structure 107. The central bearing 120 is positioned on a single side of the support 134 according to the direction of the secondary rotation axis B (below the support 134 on FIG. 4). The trunnion 132 is rotatably mounted in the central bearing 120.

The supported structure 110 is thus guided in rotation by a single bearing 120. In the illustrated embodiment (FIG. 4), and as described with reference to the first embodiment, the single central bearing 120 comprises two coaxial adjacent roller bearings 30, advantageously adjoining each other. The tilting rigidity of the central bearing 120 is adjusted to the need of rigidity of the assembly. It is all the higher the greater the distance between the intersection points C1 and C2 (FIG. 4) of the load lines the roller bearings 30 and the larger the diameter of the central bearing 120.

The supported structure 110 is asymmetrical relative to the main rotation axis A. It is symmetrical relative to the secondary rotation axis B.

The features of the support 134, as well as its relationship with the central trunnion 132 are identical with those described with reference to the first embodiment.

The supporting structure 107 is symmetrical relative to the secondary rotation axis B. It is asymmetrical relative to the main rotation axis A. It comprises a central ring 22 housing the central bearing 120, surrounded on either side thereof according to the direction of the main rotation axis A by first and second end trunnions 124, 126. The first and second end trunnions 124, 126 each extend along a same direction coinciding with the main rotation axis A. In particular, they are each substantially symmetrical relative to the main rotation axis A. As shown in FIG. 4 they extend between a first plane $P_1$ and a second plane $P_2$, the planes $P_1$ and $P_2$ being parallel with each other and containing a direction parallel to the main rotation axis A.

As is visible in FIG. 4, the supporting structure 107 has the shape of a crank shaft, the central bearing 120 being off-centered relative to the end trunnions 26, 28. The central bearing 120 is spaced away from the main rotation axis A according to the direction of the secondary rotation axis B. In particular it is shifted relative to the end trunnions 124, 126 according to the direction of the secondary rotation axis B. The central bearing 120 thus extends outside of the space delimited by the planes $P_1$ and $P_2$.

The supporting structure 107 delimits, between the end trunnions 124, 126 and facing the central bearing 120, a reception space 76 for receiving the support 134. This reception space 76 is symmetrical relative to the secondary rotation axis B. The support 134 is received at least partly into the reception space 76 between the end trunnions 126, 128. It is substantially symmetrical relative to the secondary rotation axis B.

The layout of the central bearing 120 relative to the main rotation axis A is selected so that the mass rotating around the main rotation axis A, i.e. the mass of the supported structure 110 and of the supporting structure 107, has its center of gravity as close as possible to the main rotation axis A.

Further, the mass rotating around the secondary rotation axis B, i.e. the mass of the supported structure 110, has its center of gravity as close as possible to the secondary rotation axis B.

The central trunnion 132 extends along the direction of the secondary rotation axis B, perpendicularly to the mean plane of the supporting structure 107. In the illustrated example, it extends, according to the direction of the secondary rotation axis B, beyond the end of the central bearing 120 on the side of the support 134. At its free end 73, it stops substantially at the end of the central bearing 120 opposite to the support 134.

The supported structure 107 only extends partly facing the support 134 at the first and second end trunnions 124, 126, i.e. on a portion of two side faces of the support 134 on the side of the supported structure 107. The support 134 is freely accessible through its side opposite to the trunnion 132 according to the direction of the secondary rotation axis B. In particular, the support frame 5 comprises an aperture 141 for accessing the load housed in the support 134.

The layout of the drive assembly in the central bearing 120 is identical with the one described with reference to the first embodiment.

The stabilized platform 100 according to the second embodiment has the following advantages.

The use of a single bearing 120 for guiding into rotation the supported structure 110 simplifies the design and the manufacturing of the platform 100 by avoiding having to align several bearings with each other. Further, the reduction in the number of bearings contributes to reducing the total mass of the platform 100.

The non-encompassing shape of the supporting structure 107 simplifies the manufacturing of the structure, as well as the assembling of the stabilized platform. It also improves the rigidity of the supporting structure 107 thereby reducing the risks of deformation of the platform. Further, the space available for the payload is not limited along the direction of the secondary rotation axis B by the dimensions of an encompassing supporting structure. It is thus increased as compared with a stabilized platform with an encompassing supporting structure.

For the same transported payload, the non-encompassing shape of the supporting structure 107 generates a reduction in the total mass of the platform 100.

The aperture 141 provided in the support frame facilitates the access to the payload, notably during its integration into the support 134 or during maintenance operations.

The particular shape of the supporting structure 110 with the offset central bearing 120 allows obtaining significant stability of the platform 100, in spite of the asymmetry of the supported structure 107 relative to the main rotation axis A in particular resulting from the absence of the second support 36.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A stabilized platform comprising:
   a support frame;
   a supporting structure, rotatably mounted relative to the support frame around a main axis of rotation;
   a supported structure, rotatably mounted relative to the supporting structure around a secondary rotation axis substantially perpendicular to the main rotation axis; and
   a first drive assembly, able to drive into rotation the supported structure,
   wherein the first drive assembly is housed in the central ring,
   wherein the supported structure comprises at least one support intended to receive a load,
   wherein the support frame comprises a first and second bearing,
   wherein the supporting structure comprises a central bearing, a central ring housing the central bearing and first and second end trunnions, surrounding the central ring at either side thereof according to the direction of the main rotation axis,
   wherein the first end trunnion and the second end trunnion being rotatably mounted in the first and second bearing respectively,
   wherein the supported structure is guided in rotation around the secondary rotation axis by the central bearing, which is positioned on a single side of the support according to the secondary rotation axis,
   wherein the supported structure comprises a central trunnion rotatably mounted in the central bearing, the support being positioned at one respective end of the central trunnion according to the direction of the secondary rotation axis, and
   wherein the first drive assembly comprises a first electric motor, the first electric motor comprising a stator and a rotor, the stator being fixedly mounted to the supporting structure and circumferentially surrounding the rotor, the rotor being secured to the central trunnion of the supported structure, which the rotor drives into rotation.

2. The stabilized platform according to claim 1, wherein the support frame comprises first and second bearings for guiding in rotation the supporting structure, the first and second bearings being mounted on the support frame via a system of suspensions.

3. The stabilized platform according to claim 1, wherein the first drive assembly further comprises a first angular position sensor, the central bearing being arranged, according to the direction of the secondary rotation axis, between the first drive assembly and the first angular position sensor.

4. The stabilized platform according to claim 1, wherein the support is freely accessible.

5. The stabilized platform according to claim 1, wherein at least one of the supports is accessible through an aperture provided in the support frame.

6. The stabilized platform according to claim 1, wherein the supported structure is symmetrical relative to the main rotation axis.

7. The stabilized platform according to claim 1, wherein the supported structure comprises two supports arranged on either side of the central bearing.

8. The stabilized platform according to claim 7, wherein the supports extend on either side of the supporting structure according to the direction of the secondary rotation axis.

9. The stabilized platform according to claim 1, wherein the supported structure only comprises one support located on one side of the main rotation axis, and wherein the central bearing is offset from the main rotation axis on the opposite side of the main rotation axis according to the direction of the secondary rotation axis relative to the support.

10. The stabilized platform according to claim 9, wherein the supporting structure delimits a space for receiving the support facing the central bearing according to the direction of the secondary rotation axis and wherein at least one portion of the support extends into the reception space.

11. The stabilized platform of claim 9, wherein the center of gravity of the supporting structure and the supported structure together is approximately located on the main rotation axis.

12. The stabilized platform of claim 1, wherein the central bearing comprises two adjacent angular contact ball bearings.

13. The stabilized platform of claim 1, further comprising a second drive assembly, able to drive into rotation the supporting structure, wherein the second drive assembly comprises a second electric motor, and wherein the second drive assembly is positioned at one of the first and second bearings of the support frame.

14. The stabilized platform of claim 1, wherein the first drive assembly comprises an electric device having an inductor.

* * * * *